United States Patent
Chan et al.

(10) Patent No.: US 8,042,007 B1
(45) Date of Patent: Oct. 18, 2011

(54) TRACE MODULE FOR INTEGRATED CIRCUIT DEVICES

(75) Inventors: Chi Bun Chan, San Jose, CA (US); Jingzhao Ou, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 107 days.

(21) Appl. No.: 12/549,131

(22) Filed: Aug. 27, 2009

(51) Int. Cl.
*G06F 11/00* (2006.01)
(52) U.S. Cl. .......................................... 714/45
(58) Field of Classification Search ....................... 714/45
See application file for complete search history.

(56) References Cited

U.S. PATENT DOCUMENTS

| | | | |
|---|---|---|---|
| 6,615,370 B1 * | 9/2003 | Edwards et al. | 714/45 |
| 6,813,731 B2 * | 11/2004 | Zahavi et al. | 714/45 |
| 2009/0119548 A1 * | 5/2009 | Kollmann et al. | 714/45 |
| 2010/0083052 A1 * | 4/2010 | Huber et al. | 714/45 |
| 2011/0029823 A1 * | 2/2011 | Horley et al. | 714/45 |

OTHER PUBLICATIONS

U.S. Appl. No. 12/036,920, filed Feb. 25, 2008, Ou et al.

* cited by examiner

*Primary Examiner* — Christopher McCarthy
(74) *Attorney, Agent, or Firm* — Kevin T. Cuenot; LeRoy D. Maunu

(57) ABSTRACT

A method of capturing trace data can include storing trace data from a circuit as entries within memory slots of a trace buffer. Responsive to detecting a first trigger event, a trigger bit and a time marker bit within a first trigger event entry are set, wherein the trigger bit and the time marker bit are correlated with the first trigger event. A capture region within the trace buffer having a defined range can be determined. A first time marker correlated with the time marker bit of the first trigger event entry can be stored. Content of the capture region from the trace buffer correlated time markers can be output.

20 Claims, 6 Drawing Sheets

| Memory Slot | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Trace Data | A | B | C | D | E | F | | | | | | | | | |
| Trigger Bit | | | | | | | | | | | | | | | |
| Time Marker Bit | | | | | | | | | | | | | | | |

| Memory Slot | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Trace Data | A | B | C | D | E | F | G | | | | | | | | |
| Trigger Bit | | | | | | | ▨ | | | | | | | | |
| Time Marker Bit | | | | | | | | | | | | | | | |

First Trigger Event ← P=3 → ← Q=4 →

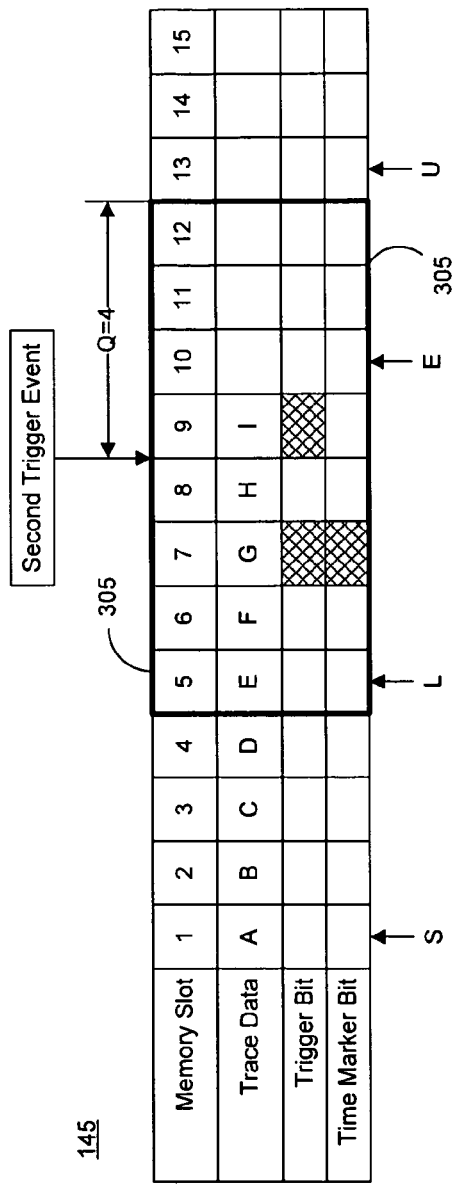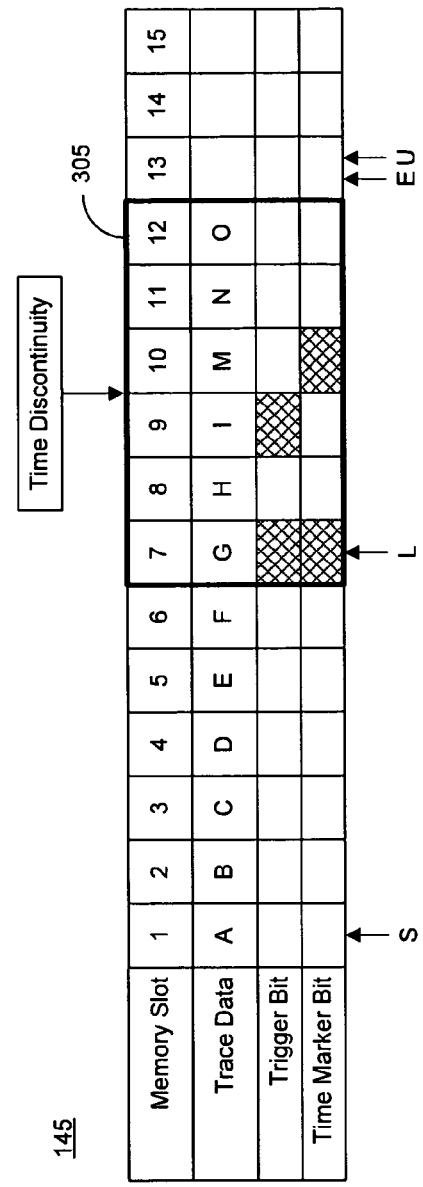
FIG. 4
FIG. 5

| Memory Slot | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| Trace Data | T | U | V | W | E | F | G | H | I | M | N | O | P | Q | R |
| Trigger Bit | | | | | | | | | ▨ | | | | | | |
| Time Marker Bit | | | | | | | ▨ | | ▨ | ▨ | | | | | |

FIG. 6

TRACE MODULE FOR INTEGRATED CIRCUIT DEVICES

FIELD OF THE INVENTION

The embodiments disclosed within this specification relate to integrated circuit devices (ICs). More particularly, the embodiments relate to a trace module that collects trace data from a circuit within an IC.

BACKGROUND

Trace capture refers to the process of collecting data from an operating electronic system and storing the data, referred to as trace data, within a memory. Trace capture techniques are used to collect different types of trace data such as signals from an electronic circuit or signals obtained from a processor. Signals collected from an electronic circuit can reveal signal transitions occurring under selected operating states or conditions. Signals collected from a processor can reveal execution flow of a program being executed by the processor.

Conventional trace capture systems store trace data in response to detecting a trigger event. When the trigger event is detected, a set of trace data is captured and stored within the trace buffer. This approach, however, provides only a partial view of the state of the electronic system as it fails to store system data that is generated prior to the occurrence of the trigger event. The system data generated prior to the trigger event, though often of significant value in terms of diagnosing a problem within the electronic system, goes uncollected.

Another disadvantage of conventional trace capture systems is their inability to process data effectively when a plurality of trigger events are detected in close temporal proximity to one another. Some trace capture systems, for example, must be re-armed after detecting each trigger event. As such, the temporal relationship between multiple trigger events that occur too close in time is not preserved or documented, particularly as the trace capture system is unable to respond to the second or third trigger event, for example.

SUMMARY

The embodiments disclosed within this specification relate to integrated circuit devices (ICs) and, more particularly, to a trace module that collects trace data from a circuit within an IC. One embodiment of the present invention can include a method of capturing trace data within an IC. The method can include storing trace data from a circuit as entries within memory slots of a trace buffer. Responsive to detecting a first trigger event, a trigger bit and a time marker bit within a first trigger event entry stored within a first current memory slot of the trace buffer can be set, wherein the trigger bit and the time marker bit are correlated with the first trigger event. Further, a capture region within the trace buffer comprising the first trigger event entry and having a ranged defined by a lower bound memory slot comprising an entry occurring prior to the first trigger event entry and an upper bound memory slot to store an entry subsequent to the first trigger event entry can be determined. Responsive to detecting the first trigger event, a first time marker correlated with the time marker bit of the first trigger event entry can be stored within a time marker memory. Content of the capture region from the trace buffer and each time marker correlated with a time marker bit within the capture region can be output to a memory device that is independent of the trace buffer.

After writing each entry of trace data into the trace buffer, an end pointer referencing a next memory slot into which a next entry is to be stored can be updated. The method also can include selecting a memory slot that is a first predetermined number of memory slots prior to the first current memory slot as the lower bound memory slot and selecting a memory slot that is a second predetermined number of memory slots after the first current memory slot as the upper bound memory slot.

Outputting content of the capture region from the trace buffer can include writing the entry stored in the lower bound memory slot to the memory device, responsive to writing the entry, updating a value of a lower bound pointer referencing the lower bound memory slot, and iteratively writing the entry stored in the lower bound memory slot indicated by the lower bound pointer and updating the value of the lower bound pointer to read out further content of the capture region.

The method can include discontinuing storing entries of trace data within the trace buffer for at least one cycle of the circuit, resuming storing entries of trace data within the trace buffer resulting in a time discontinuity between a first entry and a second entry stored in consecutive memory slots, and responsive to resuming storing of entries of trace data, setting a time marker bit in the second entry and storing a second time marker correlated with the time marker bit of the second entry within the time marker memory.

Responsive to a second trigger event, the method can include determining a second trigger event entry within the trace buffer, setting a trigger bit of the second trigger event entry, and selectively setting a time marker bit in the second trigger event entry and storing a second time marker, in the time marker memory, that is correlated with the time marker bit in the second trigger event entry according to whether the second trigger event entry is located within the capture region. The upper bound memory slot of the capture region further can be updated to a memory slot that is a predetermined number of memory slots after the second trigger event entry.

Selectively setting a time marker bit in the second trigger event entry and storing a second time marker in the time marker memory can include, when the second trigger event entry is within the capture region, not setting the time marker bit in the second trigger event entry and not storing a time marker in the time marker memory and, when the second trigger event entry is not within the capture region, setting the time marker bit in the second trigger event entry, storing a time marker in the time marker memory, and updating the lower bound pointer to reference a memory slot that is a predetermined number of memory slots prior to the second trigger event entry.

Another embodiment of the present invention can include a system that captures trace data within an IC. The system can include a trace buffer, a capture unit coupled to the trace buffer obtaining trace data from a circuit and storing trace data as entries within memory slots of the trace buffer, and a time marker memory selectively storing time markers. The system also can include a controller coupled to the capture unit, the trace buffer, and the time marker memory. Responsive to detecting a first trigger event, the controller can set a trigger bit and a time marker bit within a first trigger event entry stored within a first current memory slot of the trace buffer, wherein the trigger bit and the time marker bit are correlated with the first trigger event, determine a capture region of the trace buffer comprising the first trigger event entry and having a range defined by a lower bound memory slot comprising an entry occurring prior to the first trigger event entry and an upper bound memory slot to store an entry subsequent to the first trigger event entry, and store a first time marker correlated with the time marker bit of the first trigger event entry within the time marker memory. The system further can include an export unit coupled to the trace buffer, the controller, and the time marker memory. The export unit outputs entries of the capture region from the trace buffer and each time marker correlated with a set time marker bit of one of the output entries to a memory device that is independent of the trace buffer.

The controller further can, after each entry of trace data is written into the trace buffer, update an end pointer referencing a next memory slot into which a next entry is to be stored. The controller can select a memory slot that is a first predetermined number of memory slots prior to the first trigger event entry as the lower bound memory slot and select a memory slot that is a second predetermined number of memory slots after the first trigger event entry as the upper bound memory slot.

The export unit can iteratively output content of the capture region from the trace buffer by writing the entry stored in the lower bound memory slot to the memory device and the controller. Responsive to writing each entry from the lower bound memory slot to the memory device, the controller can update a value of a lower bound pointer referencing the lower bound memory slot.

The capture unit can discontinue storing entries of trace data within the trace buffer for at least one cycle of the circuit and subsequently resume storing entries of trace data within the trace buffer resulting in a time discontinuity between a first entry and a second entry stored in consecutive memory slots. Accordingly, the controller, responsive to resuming storing trace data, sets a time marker bit in the second entry and causes a second time marker correlated with the time marker bit of the second entry to be stored within the time marker memory.

Responsive to detecting a second trigger event, the controller can determine a second trigger event entry within the trace buffer, selectively set a trigger bit of the second trigger event entry, and set a time marker bit in the second trigger event entry and cause a second time marker that is correlated with the time marker bit in the second trigger event entry to be stored in the time marker memory according to whether the second trigger event entry is located within the capture region. The controller further can update the upper bound memory slot of the capture region to a memory slot that is a predetermined number of memory slots after the second trigger event entry.

When the second trigger event entry is within the capture region, the controller does not set the time marker bit in the second trigger event entry and does not cause a time marker to be stored in the time marker memory. When the second trigger event entry is not within the capture region, the controller sets the time marker bit in the second trigger event entry, causes a time marker to be stored in the time marker memory, and updates the lower bound pointer to reference a memory slot that is a predetermined number of memory slots prior to the second trigger event entry.

Another embodiment of the present invention can include a device comprising a data storage device usable by a system comprising a processor and a memory. The data storage device stores program code that, when executed by the system, causes the system to instantiate a trace module within a programmable IC. The trace module, after instantiation, performs operations including storing trace data from a circuit as entries within memory slots of a trace buffer. Responsive to detecting a first trigger event, the trace module can set a trigger bit and a time marker bit within a first trigger event entry stored within a first current memory slot of the trace buffer, wherein the trigger bit and the time marker bit are correlated with the first trigger event, determine a capture region of the trace buffer comprising the first trigger event entry and having a ranged defined by a lower bound memory slot comprising an entry occurring prior to the first trigger event entry and an upper bound memory slot to store an entry subsequent to the first trigger event entry, and store a first time marker correlated with the time marker bit of the first trigger event entry within a time marker memory. The trace module also can output content of the capture region from the trace buffer and each time marker correlated with a time marker bit within the capture region to a memory device that is independent of the trace buffer.

The trace module, after writing each entry of trace data into the trace buffer, can update an end pointer referencing a next memory slot into which a next entry is to be stored. The trace module further can select a memory slot a first predetermined number of memory slots prior to the first current memory slot as the lower bound memory slot and select a memory slot a second predetermined number of memory slots after the first current memory slot as the upper bound memory slot.

The trace module can write the entry stored in the lower bound memory slot to the memory device, responsive to writing the entry, update a value of a lower bound pointer referencing the lower bound memory slot, and iteratively write the entry stored in the lower bound memory slot indicated by the lower bound pointer and update the value of the lower bound pointer to read out further content of the capture region.

The trace module can discontinue storing entries of trace data within the trace buffer for at least one cycle of the circuit, resume storing entries of trace data within the trace buffer resulting in a time discontinuity between a first entry and a second entry stored in consecutive memory slots, and, responsive to resuming storing of entries of trace data, set a time marker bit in the second entry and store a second time marker correlated with the time marker bit of the second entry within the time marker memory.

Responsive to detecting a second trigger event, the trace module can determining a second trigger event entry within the trace buffer, set a trigger bit of the second trigger event entry, and selectively set a time marker bit in the second trigger event entry and store a second time marker in the time marker memory that is correlated with the time marker bit in the second trigger event entry according to whether the second trigger event entry is located within the capture region. The trace module can update the upper bound memory slot of the capture region to a memory slot a predetermined number of memory slots after the second trigger event entry.

BRIEF DESCRIPTION OF THE DRAWINGS

FIG. 2 is a second block diagram illustrating a state of a trace buffer of the trace module in accordance with another embodiment of the present invention.

FIG. 3 is a third block diagram illustrating another state of the trace buffer of the trace module in accordance with another embodiment of the present invention.

FIG. 4 is a fourth block diagram illustrating another state of the trace buffer of the trace module in accordance with another embodiment of the present invention.

FIG. 5 is a fifth block diagram illustrating another state of the trace buffer of the trace module in accordance with another embodiment of the present invention.

FIG. 6 is a sixth block diagram illustrating another state of the trace buffer of the trace module in accordance with another embodiment of the present invention.

DETAILED DESCRIPTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the embodiments of the invention.

The embodiments disclosed within this specification relate to a trace module for use within an integrated circuit device (IC). In accordance with the inventive arrangements disclosed herein, a trace module is provided that preserves trace data of a capture region that begins at a selected time prior to a detected trigger event and continues to a selected time after the trigger event. Further, when multiple trigger events are detected within a given period of time, the trace module maintains timing information as to when each trigger event is detected in relation to each other trigger event, thereby preserving timing information relating to each trigger event.

Figure 1:
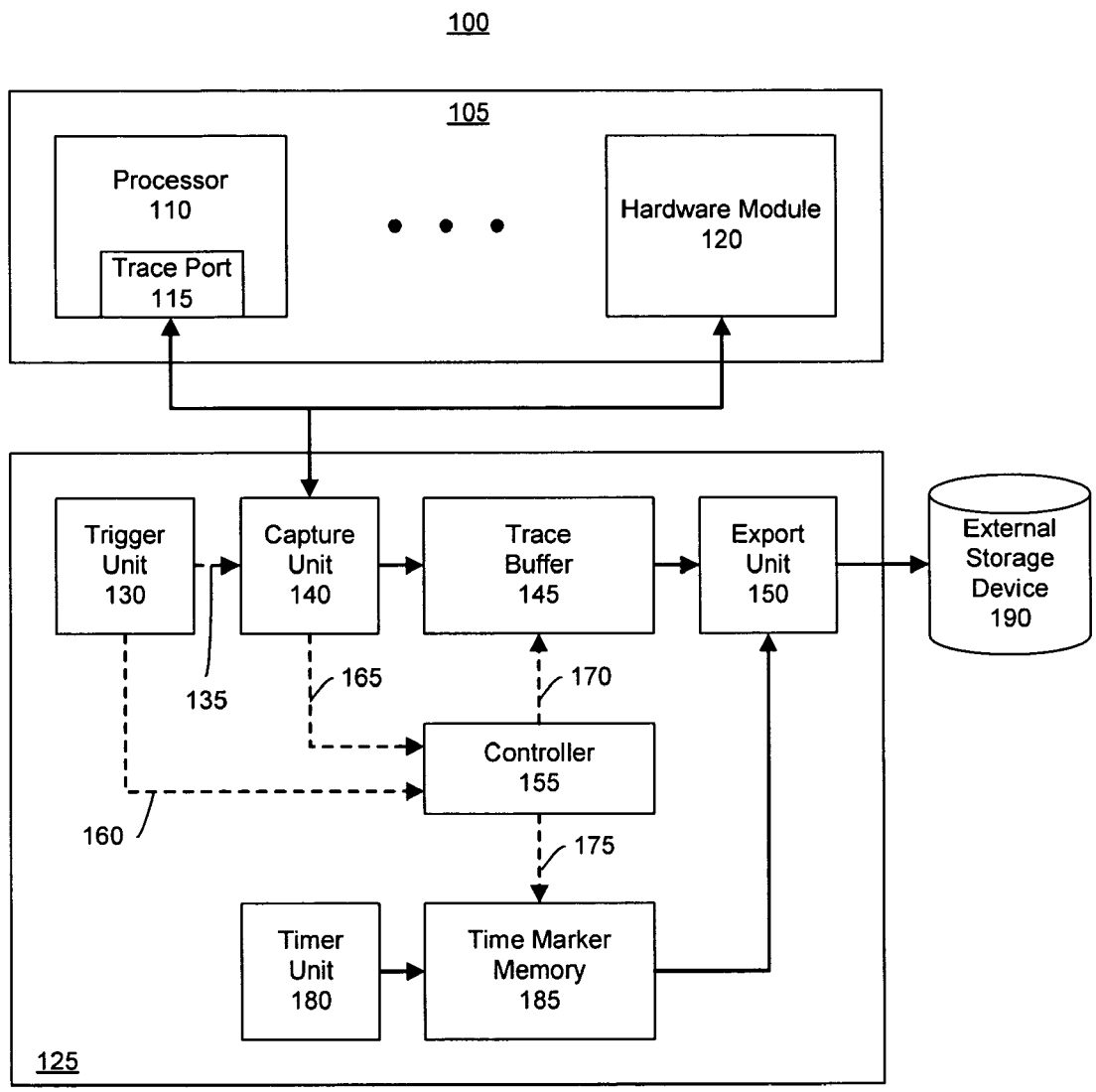
FIG. 1 is a first block diagram illustrating a trace module in accordance with one embodiment of the present invention.

FIG. 1 is a block diagram illustrating a trace module 125 in accordance with one embodiment of the present invention. As pictured in FIG. 1, an IC 100 includes a circuit 105 and trace module 125. IC 100 can be any of a variety of different ICs. In one embodiment, IC 100 can be a programmable IC, though this need not be the case.

Programmable ICs are a well-known type of IC that can be programmed to perform specified logic functions. Examples of programmable ICs can include, but are not limited to, field programmable gate arrays (FPGAs), complex programmable logic devices (CPLDs), or the like. The functionality of a programmable IC generally is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable IC are known as mask programmable devices. Programmable ICs can also be implemented in other ways, e.g., using fuse or antifuse technology. The phrase "programmable IC" can include, but is not limited to these devices and further can encompass devices that are only partially programmable. For example, one type of programmable IC includes a combination of hard-coded transistor logic and a programmable switch fabric that programmably interconnects the hard-coded transistor logic.

As shown, circuit 105 can include a processor 110 and one or more hardware modules represented by hardware module 120. Processor 110 can be implemented as a "hard" processor that is comprised of dedicated circuitry within IC 100. Alternatively, processor 110 can be implemented as a "soft" processor that is formed of programmable circuitry within IC 100 responsive to loading data bits or some other means of specifying a soft processor. In either case, processor 110 can include a trace port 115. Trace port 115 provides trace data from processor 110 to one or more components or systems residing within IC 100. As shown, trace port 115 is coupled to a capture unit 140 within trace module 125.

For purposes of illustration, circuit 105 is depicted as including both processor 105 and one or more hardware modules 120. It should be appreciated that circuit 105 can include only processor 105 or one or more hardware modules 120 without processor 105. Trace module 125 can be used with any of the combinations listed.

In one embodiment, trace port 115 can be a dedicated data port that is configured to continually output a "snapshot" of trace data from processor 110 as circuit 105 operates. As used herein, "outputting" and/or "output" can mean, for example, writing to a file, writing to a user display or other output device, storing in memory, sending or transmitting to another system, exporting, or the like. For example, trace port 115 can be implemented as a parallel interface that outputs signals representing values found within the various registers of processor 110 such as the program counter, internal registers, and the like. Trace data can be output from trace port 115 on each clock cycle controlling circuit 105. In another embodiment, trace port 115 can be a general purpose output port that is configured to continually output trace data.

Hardware module 120 represents one or more other portions of circuit 105. In the case of a programmable IC, hardware module 120 can represent one or more modules of programmable circuitry of IC 100 that have been configured to perform specified functions as described. In the example pictured in FIG. 1, hardware module 120 can be coupled to processor 110 so that both function in a cooperative manner as part of circuit 105. As shown, hardware module 120 also is coupled to capture unit 140. It should be appreciated that hardware module 120 of circuit 105 must be configured to output signals to the top level of the circuit design so that trace module 125 can interface with, and collect trace data from, hardware module 120.

Trace module 125 includes a trigger unit 130, capture unit 140, a trace buffer 145, and an export unit 150. Additionally, trace module 125 includes a controller 155, a timer unit 180, and a time marker memory 185. Within FIG. 1, signals that control data flow are illustrated as dashed lines. Signals that represent the actual flow of trace data within trace module 125 are illustrated as solid lines.

Within this specification, the same reference characters are used to refer to terminals, signal lines, wires, and their corresponding signals. In this regard, the terms "signal," "wire," "connection," "terminal," and "pin" may be used interchangeably, from time-to-time, within the this specification. It also should be appreciated that the terms "signal," "wire," or the like can represent one or more signals, e.g., the conveyance of a single bit through a single wire or the conveyance of multiple parallel bits through multiple parallel wires. Further, each wire or signal may represent bi-directional communication between two, or more, components connected by a signal or wire as the case may be.

Trigger unit 130 can include one or more matching circuits. Each matching circuit within trigger unit 130 can monitor one or more selected signals. The signals monitored by trigger unit 130 can include one or more signals that are part of the trace data, one or more signals that are obtained from circuit 105, but which are not part of the trace data, one or more signals that are received from sources external to IC 100, or any combination thereof. In this regard, trigger unit 130 can include one or more inputs (not shown) for receiving signals to be monitored. Trigger unit 130 can output a trigger signal 135 to capture unit 140 when one or more matching circuits determine that the data being monitored matches predetermined trigger criteria thereby indicating the detection and occurrence of a trigger event.

Capture unit 140 takes "snapshots" of selected signals from circuit 105. More particularly, capture unit 140 processes trace data received from processor 110 via trace port 115 and one or more monitored trace ports carrying trace data from hardware modules 120. Capture unit 140 can receive trace data from processor 110 and/or hardware module 120 on a per clock cycle basis as circuit 105 operates. Capture unit 140 can format received trace data into entries and continually store entries within trace buffer 145. In one embodiment, capture unit 140 stores an entry of trace data for each clock cycle of circuit 105. Accordingly, when a trigger event is detected by trigger unit 130, trace data collected prior to the occurrence of the trigger event will have already been stored within trace buffer 145.

Under selected circumstances, for one or more clock cycles of circuit 105, capture unit 140 can be instructed, e.g., by trigger unit 130 or by another circuit (not shown), not to store entries of trace data within trace buffer 145. In that case, capture unit 140 can temporarily stop writing entries of trace data to trace buffer 145 and subsequently resume writing entries of trace data to trace buffer 145 when instructed to resume the storing of trace data.

Trace buffer 145 is a physical memory. In one embodiment, trace buffer 145 is implemented as a circular buffer. Trace buffer 145 stores entries of trace data written by capture unit 135. Trace buffer 145 is organized into a plurality of memory slots. Each memory slot of trace buffer 145 stores an entry of trace data collected from circuit 105, e.g., processor 110 and/or hardware module 120.

In one embodiment, trace buffer 145 can be implemented as a dual port random access memory. In that case, a first port of trace buffer 145 can be used to write entries of trace data into memory slots of trace buffer 145. A second port of trace buffer 145 can be used to read entries out of trace buffer 145 and output the trace data to export unit 150.

Controller 155 coordinates operation of trigger unit 130, capture unit 140, trace buffer 145, and time marker memory 185 via control signals 160, 165, 170, and 175. In one embodiment, controller 155 can include a plurality of registers, e.g., control registers. Each register can indicate a particular condition, state, or the like. In one aspect, each register of controller 155 can store a pointer. The operation of the registers and pointers stored therein will be described in greater detail with reference to the remaining figures. In general, however, the pointers control read and write operations of trace buffer 145. For example, a plurality of pointers can be maintained that indicate information such as the memory slot within which a new entry is to be stored, which memory slots store valid trace data, e.g., entries, which memory slots are to be read out from trace buffer 145, and the like.

In addition to controlling operation of trace buffer 145, controller 155 also can include one or more registers that control or indicate when time markers are stored within time marker memory 185. Timer unit 180 generates time markers as a reference for indicating when a trigger event is detected by trigger unit 130. For example, timer unit 180 can be a free running clock, a circuit that generates time stamps, or the like. When an appropriate register in controller 155 indicates that a trigger event has been detected according to trigger unit 130, timer unit 180 can store a time marker within time marker memory 185. It should be appreciated, however, that time markers can be stored as a consequence of other conditions or states and not just in response to trigger signals or the detection of a trigger event. As such, time marker memory 185 does not continuously store time markers, but rather stores time markers in response to particular conditions.

In one embodiment, time marker memory 185 is implemented as a first-in-first-out (FIFO) memory. In this manner, time markers stored first in time are read out of time marker memory 185 prior to those stored later in time. Controller 155 coordinates when time markers are read out to coincide with entries read from trace buffer 145 that have a set time marker bit. A set time marker bit in an entry indicates that a time marker corresponding to that entry has been stored within time marker memory 185. In general, controller 155 can cause a time marker to be read out from time marker memory 185 when an entry is read from trace buffer 145 that has a set time marker bit.

Export unit 150 can coordinate the output of entries of trace data from trace buffer 145 with time markers read from time marker memory 185. Each time marker can be inserted into the data stream proximate to the entry that corresponds to the time marker, e.g., proximate to the entry having a set time marker bit correlated with the time marker. For example, the time marker can be inserted into the data stream immediately adjacent to the correlated entry, at any point prior to the next entry having its time marker bit set, or the like. In any case, export unit 150 can output the combined data, e.g., entries of trace data with correlated time markers, to external storage device 190, e.g., a storage device or memory that is not implemented upon, or within, IC 100.

FIGS. 2-6 are block diagrams illustrating operational aspects of trace module 125 of FIG. 1 in accordance with the inventive arrangements disclosed herein. More particularly, FIGS. 2-6 illustrate the state of trace buffer 145 at various times during operation of trace module 125. Referring to FIGS. 2-6, trace buffer 145 is shown as having only "N" memory slots, where N=15. It should be appreciated that a typical trace buffer will have more than 15 memory slots. Still, the trace buffer also can have fewer than 15 memory slots and is not intended to be limited by the number of memory slots illustrated.

Each of memory slots 1-15 has a portion that stores trace data. The trace data portion of an entry stored within each memory slot is indicated with a letter. Each entry, or memory slot, as the case may be, also includes a trigger bit and a time marker bit. In general, each memory slot can correspond to, and store, trace data in the form of an entry for a given cycle of operation of the circuit being monitored. While consecutive cycles of trace data can be stored, one or more cycles of trace data can be skipped, e.g., not stored, as will be described with reference to the remaining figures. The trigger bit and the time marker bit may or may not be set for different entries as will be described with reference to FIGS. 3-6.

FIG. 2 illustrates the case where the capture unit has started storing trace data within trace buffer 145. The capture unit stores trace data without first receiving a trigger signal from the trigger unit. As shown in FIG. 2, for example, letters A, B, C, D, E, and F represent trace data of entries stored within memory slots 1-6 respectively. By continually storing trace data, a history of trace data is collected and available when a trigger event is detected. In the example pictured in FIG. 2, the capture unit has stored seven entries within consecutive memory slots 1-6. The trigger bits and time marker bits corresponding to entries A-F are not set.

For purposes of description, although the letters A-F represent portions of an entry within trace buffer 145, letters will be used, from time to time, to refer to entries. Similarly, memory slots can be used to refer to entries, e.g., memory slot 3 in reference to entry "C." In this regard, a memory slot number and the letter used to refer to trace data or an entry can be used interchangeably to refer to the entry or the memory slot storing that entry within this specification.

It should be appreciated that since trace buffer 145 is circular in nature, terms referring to time, e.g., earliest, latest, prior, later, or subsequent, generally are used to refer to entries and/or memory slots. Time-based terms largely are used in lieu of terms that refer to address relationships such as minimum and maximum, which may be inaccurate when referring to a circular buffer, particularly, in the event the circular buffer "wraps" around and begins overwriting older entries.

When the capture unit begins storing trace data, the trace module must determine which entries are valid and which are not. Referring again to FIG. 2, a first pointer denoted as "S" represents a start pointer. As noted, pointers can be stored within registers of the controller of the trace module (not shown). The start pointer stores the address of a memory slot within trace buffer 145 that stores an entry of trace data that is the first valid entry in a range of valid entries. As shown, the start pointer S stores an address corresponding to memory slot 1 of trace buffer 145. Memory slot 1 stores entry "A."

A second pointer denoted as "E" represents an end pointer. The end pointer stores the address of a memory slot in trace buffer 145 that stores an entry of trace data that indicates the last valid entry in a range of valid entries. As shown, the end pointer E stores an address corresponding to memory slot 7 of trace buffer 145. Memory slot 7, as indicated by end pointer E, is the next memory slot to be written and further indicates that the memory slot 6 stores the most recent entry of trace data, e.g., entry F of trace data.

FIG. 3 illustrates another state of trace buffer 145 in accordance with another embodiment of the present invention. More particularly, FIG. 3 illustrates an operational state in which a first trigger event has been detected and the trigger unit has issued a first trigger signal. The first trigger signal is received at or about the time entry G within memory slot 7 is stored. For purposes of illustration, the first trigger event occurs subsequent to the writing of memory slots 6 and prior to the writing of memory slot 7. Accordingly, the trigger bit and the time marker bit corresponding to memory slot 7 are set as indicated by the shaded boxes within the rows labeled "Trigger Bit" and "Time Marker Bit" within the column corresponding to memory slot 7. For purposes of illustration, entry G stored within memory slot 7 is referred to as the "first trigger event entry."

Responsive to the first trigger event, the controller sets the trigger bit of the first trigger event entry. The controller also sets the time marker bit of the first trigger event entry in response to the first trigger event when the first trigger event entry is not located within a capture region corresponding to a prior detected trigger event. The controller further instructs the time marker memory (not shown) to store a time marker from the timer unit. Accordingly, the time marker memory stores a time marker that is correlated with the time marker bit set within the first trigger event entry stored in memory slot 7. The time marker bits and the time markers are correlated as the number of time makers stored within time marker memory coincides with the number of valid entries in the trace buffer having set time marker bits.

When the first trigger signal is output from the trigger unit, the controller defines a first capture region, e.g., capture region 305. Thus, with the first trigger event being correlated with memory slot 7, capture region 305 is defined. Within FIG. 3, capture region 305 is illustrated with a bounding box that begins at memory slot 4 and continues up to, and includes, memory slot 10. As shown, capture region 305 begins at a memory slot that stores an entry that is earlier in time than the first trigger event entry, e.g., memory slot 4. Capture region 305 includes the first trigger event entry and continues to a memory slot that will store an entry that occurs later in time than the first trigger event entry, e.g., memory slot 10.

FIG. 3 illustrates a third pointer denoted as "L," which represents a lower bound pointer. The lower bound pointer L stores a value that references the memory slot of the trace buffer that is the lower bound of capture region 305. In one embodiment, since entries of trace data are stored at largely regular time intervals, the lower bound pointer L can reference a memory slot that stores an entry that occurred at least a predetermined amount of time prior to the first trigger event entry. In another embodiment, the lower bound pointer L can reference a memory slot that is a first predetermined number of memory slots prior to the memory slot storing the first trigger event entry. For example, the memory slot storing the entry that corresponds to the start of capture region 305 can be immediately adjacent to memory slot 7 or can be separated from memory slot 7 by at least a predetermined number of memory slots as shown in FIG. 3.

The parameter "P," as illustrated in FIG. 3, for example, can be a user adjustable parameter that represents the pre-trigger capture region size in term of number of entries. As such, the parameter P specifies which memory slot the lower bound pointer L will indicate with reference to the location of the trigger event. Referring to FIG. 3, for example, a user can specify that the value of P is three. Accordingly, when the first trigger event entry is determined to be stored within memory slot 7, the lower bound pointer L is set to reference a memory slot that is three memory slots prior to memory slot 7, e.g., memory slot 4 as shown in FIG. 3.

A fourth pointer denoted as "U," represents an upper bound pointer. The upper bound pointer U stores a value that references the memory slot of the trace buffer that is the upper bound of capture region 305 and which is the memory slot immediately after the last memory slot of capture region 305. In one embodiment, the upper bound pointer U references a memory slot that will store an entry generated later in time, e.g., after, the first trigger event entry. In another embodiment, the upper bound pointer can reference a memory slot that is a second predetermined number of memory slots after the memory slot storing the first trigger event entry. The first and second predetermined number of memory slots used to determine the size of capture region 305 may or may not be equal. Thus, the memory slot storing the entry that corresponds to the end of capture region 305 can be immediately adjacent to memory slot 7 or can be separated from memory slot 7 by at least a predetermined number of memory slots as shown in FIG. 3.

The parameter "Q," as illustrated in FIG. 3, for example, can be a user adjustable parameter that represents the post-trigger capture region size. The parameter Q can be defined to include the moment when the trigger event occurs, and thus, memory slot 7. Accordingly, parameter Q can specify which memory slot the upper bound pointer U will indicate with reference to the location of the trigger event. Referring to FIG. 3, for example, a user can specify that the value of Q is four. Accordingly, when the first trigger event entry is determined to be stored within memory slot 7, capture region 305 is set to include memory slot 10 as the last memory slot of capture region 305. The upper bound pointer U is set to reference the next memory slot beyond, e.g., after, memory slot 10. Thus, the upper bound pointer U can be determined to reference memory slot 11 by adding a value of "Q" to the memory slot storing the first trigger event, e.g., memory slot 7 as shown in FIG. 3. The upper bound pointer U references the upper bound memory slot which is the memory slot that is immediately after the latest, or upper most, memory slot of capture region 305. In this manner, the upper bound pointer U defines the upper bound of capture region 305.

As shown in FIG. 3, the end pointer E indicates the end of valid trace data as well as the next memory slot into which an entry is to be stored has been incremented to reference memory slot 8. The start pointer S indicating the start of valid trace data continues to reference memory slot 1. The lower bound pointer L references a memory slot that is located between the start pointer S and the end pointer E.

FIG. 4 illustrates another state of trace buffer 145 in accordance with another embodiment of the present invention. More particularly, FIG. 4 illustrates an operational state in which a second trigger event has been detected and the trigger unit has issued a second trigger signal. The second trigger signal is received at or about the time entry I is stored within memory slot 9. For example, the second trigger event can be detected subsequent to the storing of entry H into memory slot 8 and prior to the storage of entry I into memory slot 9. Accordingly, the controller sets the trigger bit corresponding to entry I as indicated by the shaded box in the row labeled "Trigger bit" in the column for memory slot 9. For purposes of illustration, entry I stored within memory slot 9 is referred to as the "second trigger event entry."

In the example pictured in FIG. 4, because the second trigger event entry is within capture region 305 already defined for the first trigger event as illustrated in FIG. 3, the time marker bit within the second trigger event entry, e.g., entry I stored within memory slot 9, is not set. Accordingly, the controller does not store a time marker within the time marker memory. The time of the second trigger event can be determined by virtue of the position of the memory slot in which the trigger bit for the second trigger event entry is stored in relation to the first trigger event entry in trace buffer 125.

Responsive to the second trigger event, the controller updates capture region 305. As noted, capture region 305 is indicated by lower bound pointer L and upper bound pointer U, which have previously been described with reference to FIG. 3. The controller maintains the lower bound pointer L and the upper bound pointer U to indicate one capture region that is updated over time as further trigger events are detected and as entries are read from trace buffer 145.

In this example, responsive to the second trigger event, the upper bound pointer U is updated to reference memory slot 13. The upper bound pointer U is updated to reference a memory slot that is a predetermined distance from, e.g., a predetermined number of memory slots after, memory slot 9 storing the second trigger event entry, i.e., entry I. When a trigger signal is received and the current entry is within an existing capture region, as illustrated in FIG. 4, the lower bound pointer L of the capture region is not reset or updated. Rather, the memory slot referenced by the lower bound pointer L is a function of which valid entries have been read out of capture region 305 for storage in another memory. In the example of FIG. 4, the export unit has started reading entries from capture region 305, e.g., entry D. Accordingly, the controller updates the lower bound pointer L to reference memory slot 5, e.g., the next memory slot of capture region 305 to be read.

The end pointer E, which indicates the end of valid trace data, is updated to reference memory slot 10 as the next available memory slot in trace buffer 145 within which an entry will be stored. The start pointer S, which indicates the start of valid trace data, continues to reference memory slot 1.

FIG. 5 illustrates another state of trace buffer 145 in accordance with another embodiment of the present invention. More particularly, FIG. 5 illustrates an operational state in which one or more entries have been skipped. As described with reference to FIG. 1, under particular conditions, the capture unit may not store trace data on each cycle of the circuit. FIG. 5 illustrates the situation in which trace data has not been stored within trace buffer 145 for at least one cycle of the circuit. In the example pictured in FIG. 5, trace data has not been stored for three cycles of the circuit. As shown, the entries continue uninterrupted and in sequence from A-I. Entries J, K, and L have been skipped. More particularly, entries J, K, and L have not been stored within trace buffer 145. When at least one entry is not written to trace buffer 145 during operation of the circuit, a time discontinuity results when storage of trace data continues. Two entries will represent cycles of operation of the circuit that are not consecutive cycles.

When storage of trace data resumes, e.g., referring to entry M in memory slot 10, the time marker bit in the first entry made when collection of trace data continues or resumes is set. Thus, the controller sets the time marker bit of entry M as shown in FIG. 5. Correspondingly, the controller instructs the time marker memory to store a time marker corresponding to the time marker bit that is set in entry M.

FIG. 5 also illustrates that the start pointer S continues to reference memory slot 1. The lower bound pointer L references memory slot 7, which is the lower bound of capture region 305. As shown, capture region 305 has decreased in size since entries D, E, and F have been read out of trace buffer 145. The state of lower bound pointer L, referencing memory slot 7, indicates that entries D, E, and F have been read out of trace buffer 145 and output by the export unit. In the example pictured in FIG. 5, since no further trigger events have been detected, the end pointer E, indicating the end of valid trace data and the next memory slot to be written, effectively "catches up" to the upper bound pointer U, which continues to reference memory slot 13 as the upper bound of capture region 305.

FIG. 6 illustrates another state of trace buffer 145 in accordance with another embodiment of the present invention. More particularly, FIG. 6 illustrates an operational state in which the trace buffer is filled and new entries begins to overwrite older entries. As shown, the older entries A, B, C, and D have been overwritten with entries T, U, V, and W. Since trace buffer 145 is maintained as a circular buffer, after writing to memory slot 15, the controller causes memory slot 1 to be written next.

In the example shown in FIG. 6, no further trigger events have been detected. Accordingly, capture region 305 continues to decrease in size as the export unit continues to read out and output further entries from trace buffer 145. Accordingly, the lower bound pointer L now indicates entry I. Thus, continuing from FIG. 5, entries G and H have been read from trace buffer 145, with entry I being the next entry to be read and output. The upper bound of the capture region remains unchanged since the upper bound pointer U references memory slot 13, which now stores entry P.

The start pointer S, which indicates the start of valid trace data, begins to advance once trace buffer 145 begins overwriting older entries and now references memory slot 5. The end pointer E, which indicates the end of valid trace data and the memory slot to store the next entry, also indicates memory slot 5. Thus, the next entry, which will be entry X, will be written to memory slot 5, thereby overwriting the oldest entry, i.e., entry E, in trace buffer 125. Once trace buffer 145 begins to overwrite older entries, start pointer S and end pointer E begin to move in lock-step, e.g., in the same manner.

Referring to FIGS. 2-6, one can extract various relationships between the pointers described. In general, the lower bound pointer L is always less than or equal to the latest of the start pointer, or the earliest of either the last value of the upper bound pointer L or the difference between the end pointer E and P. As noted, P represents the pre-trigger capture region size in term of number of entries. Thus, using the letters to represent each respective pointer, the value of the lower bound pointer L can be expressed as: L=latest(S,earliest(L, E−P). The upper bound pointer U is always less than or equal to the sum of the end pointer and Q. As discussed, Q represents the post-trigger capture region size which includes the moment when the trigger event occurs. The value of the upper bound pointer can be expressed as: U=E+Q.

Figure 7:
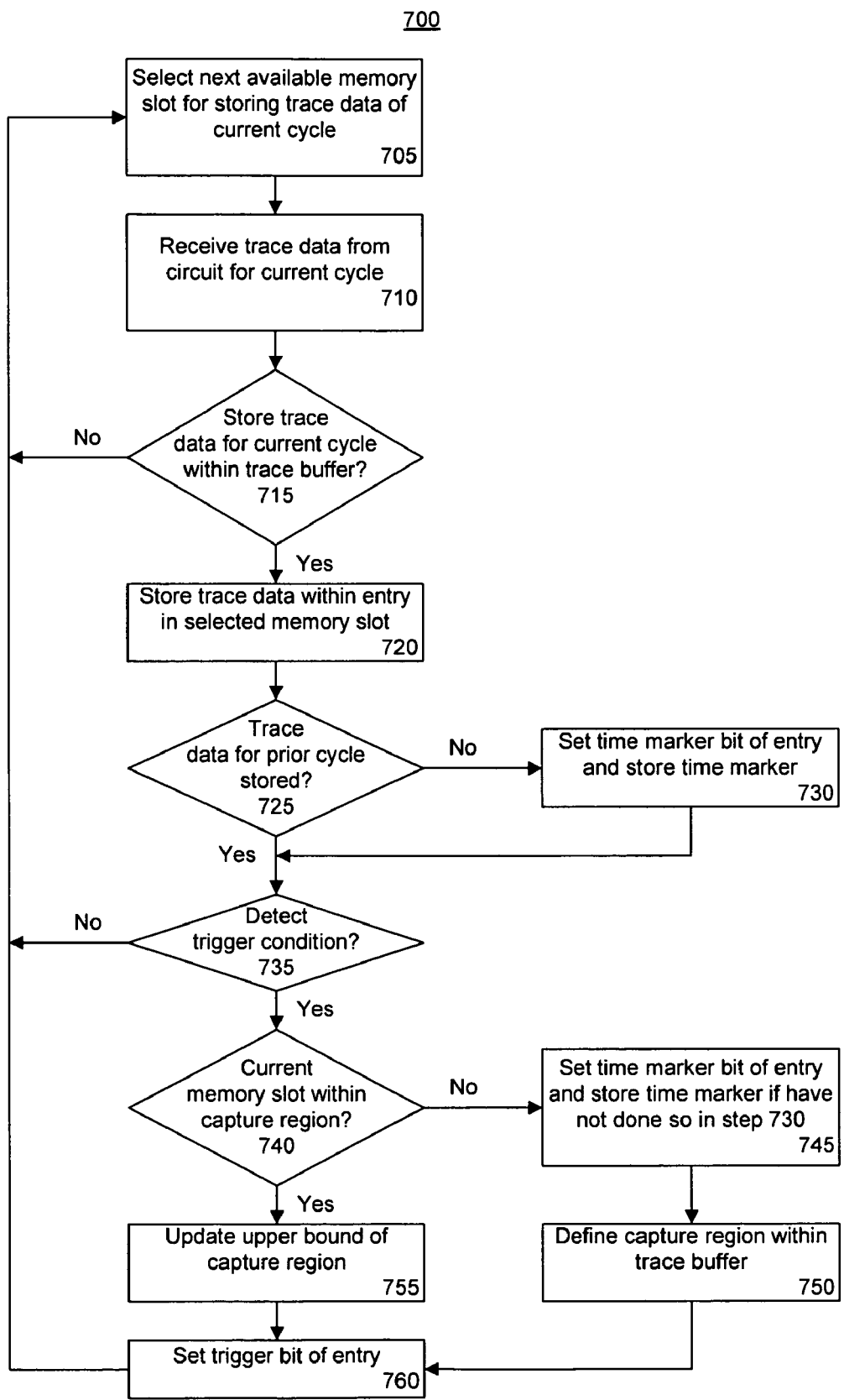
FIG. 7 is a first flow chart illustrating a method of obtaining trace data from a circuit in accordance with another embodiment of the present invention.

FIG. 7 is a flow chart illustrating a method 700 of obtaining trace data from a circuit in accordance with another embodiment of the present invention. Method 700 can be implemented by a system as described with reference to FIGS. 1-6.

Method 700 can begin in step 705 where a next available memory slot of the trace buffer can be selected for storing trace data for the current cycle of operation of the circuit being monitored. As noted, the controller can include registers that store the various pointers described herein. The start pointer S references a memory slot that is the start of valid trace data. The end pointer E references a memory slot that corresponds to the end of valid trace data and, further, is the next available memory slot, e.g., the next memory slot to be written with an entry. At the start of method 700, the start pointer S and the end pointer E can be initialized to reference the same memory slot of the trace buffer, e.g., the first memory slot to be written.

It should be appreciated that as method 700 iterates, end pointer E can be incremented to reference the next available memory slot. Start pointer S can remain initialized until the trace buffer begins overwriting prior stored entries, at which point start pointer S can be incremented in the same manner as end pointer E.

In step 710, the trace module can receive trace data from the circuit being monitored for the current cycle of operation. More particularly, the capture unit can receive trace data. In step 715, the capture unit can determine whether the trace data for the current cycle of operation of the circuit is to be stored within the trace buffer as an entry. As noted, one or more signals can be provided to the capture unit that can instruct the capture unit not to store trace data on selected cycles. When the trace data for the current cycle is not to be stored within the trace buffer, method 700 can loop back to step 705 to continue obtaining further trace data. When the trace data for the current cycle is to be stored within the trace buffer, method 700 can proceed to step 720.

In step 720, the capture unit can store the trace data received for the current cycle within the selected memory slot of the trace buffer. The entry stored within the current memory slot, at least with respect to method 700, is also referred to as the "current entry." In step 725, the capture unit can determine whether the trace data for the prior cycle was stored within the trace buffer. If not, a time discontinuity exists in the entries within the trace buffer and method 700 proceeds to step 730. Accordingly, in step 730, the controller can set the time marker bit in the current entry indicating the time discontinuity. Further, the controller causes a time marker from the timer unit to be stored within the time memory marker memory. The time marker stored in step 730 is correlated with the time marker bit set in the current entry.

Continuing with step 735, the controller can determine whether a trigger event has been detected. When no trigger event is detected for the current entry, method 700 can loop back to step 705 to continue processing. When a trigger event is, or has been, detected for the current entry, method 700 can proceed to step 740.

In step 740, the controller can determine whether the current memory slot is located within an existing capture region. When the current memory slot is not located within a capture region, method 700 can proceed to step 745. In step 745, the time marker bit of the current entry, e.g., the first trigger event entry, is set and a time marker is stored within the time marker memory. If the time marker bit of the current entry was previously set and a time marker was previously stored in step 730, the time marker bit of the current entry need not be manipulated any further and no additional time marker need be stored.

In step 750, a capture region can be defined. More particularly, the upper bound pointer U and the lower bound pointer L can be determined. As noted, the size of the capture region can be a predetermined size in that the capture region can extend a first predetermined number of memory slots prior to, and a second predetermined number of memory slots after the current memory slot storing the first trigger event entry.

Referring again to step 740, when the current memory slot is within a capture region, method 700 can proceed to step 755. In that case, the time marker bit of the current entry, which will be, for example, the second trigger event entry in this case, is not set and no time marker is stored for purposes of documenting the occurrence of the trigger event. The time marker bit may have been set and a time marker may have been stored, however, in step 730 to document a time discontinuity in the trace data. The setting of the time marker bit of the current entry in response to a time discontinuity is independent of whether the time marker bit is set in response to a trigger event.

In step 755, the upper bound pointer U defining the end of the capture region can be updated thereby extending the capture region according to the location of the current memory slot storing the second trigger event entry within the trace buffer. As noted, the upper bound pointer U can be updated to reference a memory slot that is a second predetermined number of memory slots the current memory slot storing the second trigger event entry.

In step 760, the trigger bit for the current entry can be set. After step 760, method 700 can loop back to step 705 to continue collecting further trace data as described.

Figure 8:
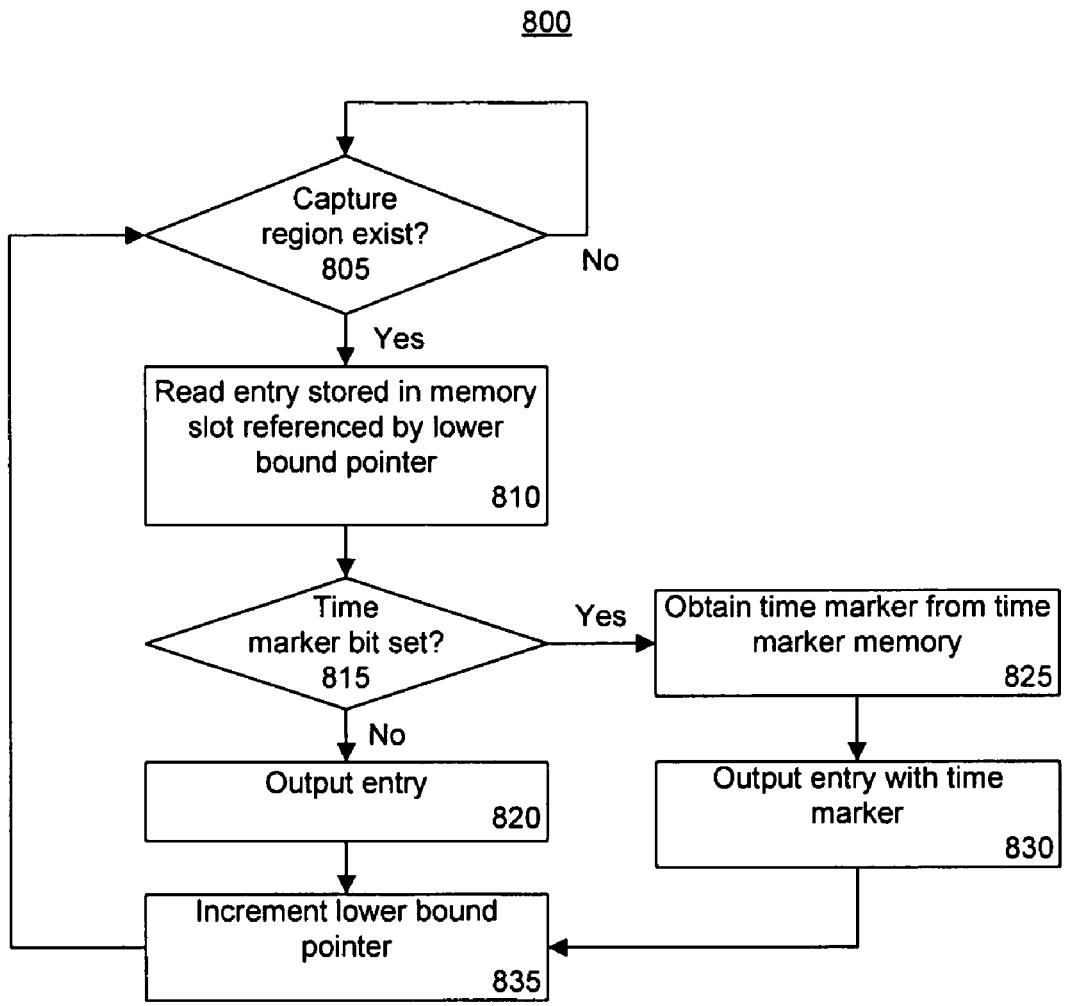
FIG. 8 is a second flow chart illustrating a method of outputting trace data collected from a circuit in accordance with another embodiment of the present invention.

FIG. 8 is a flow chart illustrating a method 800 of outputting trace data collected from a circuit in accordance with another embodiment of the present invention. Method 800 can be implemented by a trace module as described with reference to FIGS. 1-7. It should be appreciated that method 800 represents a method that can be performed in combination, e.g., concurrently, with method 700 of FIG. 7. Accordingly, while trace data is collected and stored within the trace buffer, entries of trace data can be output from the trace buffer in response to detecting a trigger event.

Accordingly, in step 805, the controller can determine whether a capture region exists. It should be appreciated that when a capture region exists, e.g., as determined from the upper bound pointer U and the lower bound pointer L, at least one trigger event has occurred and trace data relating to the detected trigger event is to be output from the trace module. When a capture region does not exist, the upper bound pointer U and the lower bound pointer L will reference the same memory slot. In that case, method 800 can continue to iterate until such time that a capture region comes into existence. When a capture region does exist, the upper bound pointer U and the lower bound pointer L will reference different memory slots. In that case, method 800 continues to step 810.

In step 810, the entry stored in the memory slot referenced by the lower bound pointer L is read. In step 815, the controller can determine whether the time marker bit of the entry read in step 810 is set. If so, method 800 can continue to step 825. If not, method 800 can proceed to step 820.

In step 825, when the time marker bit is set, the controller instructs the time marker memory to output a time marker. As noted, the time marker memory can be a first-in-first-out memory. Accordingly, the oldest time marker is output to the export unit. In step 830, the export unit can output the entry read in step 810 in combination, or with, the time marker obtained from the time marker memory in step 815. After step 830, the method can proceed to step 835.

Referring again to step 820, when the time marker bit of the entry read in step 810 is not set, the export unit can output that entry, e.g., with no time marker. In step 835, the lower bound pointer can be incremented to reference the next memory slot.

The embodiments disclosed within this specification provide a trace module that stores trace data from a circuit. By continually capturing trace data, e.g., even in the absence of a trigger event, trace data captured prior to the occurrence of a trigger event can be preserved and output. Further, the trace module preserves temporal relationships among multiple trigger events when those multiple trigger events are detected within close proximity to one another, e.g., when at least a second trigger event occurs within the time period defined by the size of the capture region.

The flowcharts in the figures illustrate the architecture, functionality, and operation of possible implementations of systems, methods, and computer program products according to various embodiments of the present invention. In this regard, each block in the flowcharts may represent a module, segment, or portion of code, which comprises one or more portions of executable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and executable instructions.

Embodiments of the present invention can be realized in hardware or a combination of hardware and software. The embodiments can be realized in a centralized fashion in one system or in a distributed fashion where different elements are spread across several interconnected systems. Any kind of data processing system or other apparatus adapted for carrying out the methods described herein is suited.

Embodiments of the present invention further can be embedded in a device such as a computer program product, which comprises all the features enabling the implementation of the methods described herein. The device can include a data storage medium or device, e.g., a computer-usable or computer-readable device, storing program code that, when loaded and executed in a system comprising memory and a processor, causes the system to instantiate a trace module system within an IC that is coupled to the system. The trace module, once instantiated within the IC, can perform the operations described herein. Examples of data storage devices can include, but are not limited to, optical devices, magnetic devices, magneto-optical devices, computer memory such as random access memory or hard disk(s), or the like.

The terms "computer program," "software," "application," "computer-usable program code," "program code," "executable code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

The embodiments disclosed herein can be embodied in other forms without departing from the spirit or essential attributes thereof. Accordingly, reference should be made to the following claims, rather than to the foregoing specification, as indicating the scope of the embodiments of the present invention.

What is claimed is:

1. Within an integrated circuit, a method of capturing trace data comprising:
    storing trace data from a circuit as entries within memory slots of a trace buffer;
    wherein the storing of trace data is independent of occurrence of trigger events;
    responsive to detecting a first trigger event,
        setting a trigger bit and a time marker bit within a first trace data entry stored within a first current memory slot of the trace buffer, wherein the trigger bit and the time marker bit are correlated with the first trigger event,
        determining a capture region within the trace buffer comprising the first trace data entry and having a range defined by a lower bound memory slot comprising an entry occurring prior to the first trace data entry and an upper bound memory slot to store an entry subsequent to the first trace data entry, wherein each memory slot of the capture region is associated with the first trigger event, and
        storing a first time marker correlated with the time marker bit of the first trace data entry within a time marker memory; and
    outputting content of the capture region from the trace buffer and outputting from the time marker memory each time marker correlated with a time marker bit within the capture region to a memory device that is independent of the trace buffer, wherein the outputting of each time marker to the memory device bypasses storage of the time marker in the trace buffer.

2. The method of claim 1, further comprising, after writing each entry of trace data into the trace buffer, updating an end pointer referencing a next memory slot into which a next entry is to be stored.

3. The method of claim 1, further comprising:
selecting a memory slot that is a first predetermined number of memory slots prior to the first current memory slot as the lower bound memory slot; and
selecting a memory slot that is a second predetermined number of memory slots after the first current memory slot as the upper bound memory slot.

4. The method of claim 1, wherein outputting content of the capture region from the trace buffer comprises:
writing the entry stored in the lower bound memory slot to the memory device;
responsive to writing the entry, updating a value of a lower bound pointer referencing the lower bound memory slot; and
iteratively writing the entry stored in the lower bound memory slot indicated by the lower bound pointer and updating the value of the lower bound pointer to read out further content of the capture region.

5. The method of claim 1, further comprising:
discontinuing storing entries of trace data within the trace buffer for at least one cycle of the circuit;
resuming storing entries of trace data within the trace buffer resulting in a time discontinuity between a first entry and a second entry stored in consecutive memory slots; and
responsive to resuming storing of entries of trace data, setting a time marker bit in the second entry and storing a second time marker correlated with the time marker bit of the second entry within the time marker memory.

6. The method of claim 1, wherein the method further comprises, responsive to detecting a second trigger event:
determining a second trace data entry within the trace buffer;
setting a trigger bit of the second trace data entry;
selectively setting a time marker bit in the second trace data entry and storing a second time marker, in the time marker memory, that is correlated with the time marker bit in the second trace data entry according to whether the second trace data entry is located within the capture region; and
updating the upper bound memory slot of the capture region to a memory slot that is a predetermined number of memory slots after the second trace data entry.

7. The method of claim 6, wherein selectively setting a time marker bit in the second trace data entry and storing a second time marker in the time marker memory comprises:
when the second trace data entry is within the capture region, not setting the time marker bit in the second trace data entry and not storing a time marker in the time marker memory; and
when the second trace data entry is not within the capture region, setting the time marker bit in the second trace data entry, storing a time marker in the time marker memory, and updating the lower bound pointer to reference a memory slot that is a predetermined number of memory slots prior to the second trace data entry.

8. Within an integrated circuit device (IC), a system that captures trace data within the (IC), the system comprising:
a trace buffer;
a capture unit coupled to the trace buffer obtaining trace data from a circuit and storing trace data as entries within memory slots of the trace buffer;
wherein the capture unit is configured to store trace data independent of occurrence of trigger events;
a time marker memory selectively storing time markers;
a controller coupled to the capture unit, the trace buffer, and the time marker memory;
wherein, responsive to detecting a first trigger event, the controller:
sets a trigger bit and a time marker bit within a first trace data entry stored within a first current memory slot of the trace buffer, wherein the trigger bit and the time marker bit are correlated with the first trigger event,
determines a capture region of the trace buffer comprising the first trace data entry and having a range defined by a lower bound memory slot comprising an entry occurring prior to the first trace data entry and an upper bound memory slot to store an entry subsequent to the first trace data entry, wherein each memory slot of the capture region is associated with the first trigger event, and
stores a first time marker correlated with the time marker bit of the first trace data entry within the time marker memory; and
an export unit coupled to the trace buffer, the controller, and the time marker memory,
wherein the export unit outputs entries of the capture region from the trace buffer and outputs from the time marker memory each time marker correlated with a set time marker bit of one of the output entries to a memory device that is independent of the trace buffer, wherein the output of each time marker to the memory device bypasses storage of the time marker in the trace buffer.

9. The system of claim 8, wherein the controller, after each entry of trace data is written into the trace buffer, updates an end pointer referencing a next memory slot into which a next entry is to be stored.

10. The system of claim 8, wherein the controller selects a memory slot that is a first predetermined number of memory slots prior to the first trace data entry as the lower bound memory slot and selects a memory slot that is a second predetermined number of memory slots after the first trace data entry as the upper bound memory slot.

11. The system of claim 8, wherein the export unit iteratively outputs content of the capture region from the trace buffer by writing the entry stored in the lower bound memory slot to the memory device and the controller, responsive to writing each entry from the lower bound memory slot to the memory device, updates a value of a lower bound pointer referencing the lower bound memory slot.

12. The system of claim 8, wherein:
the capture unit discontinues storing entries of trace data within the trace buffer for at least one cycle of the circuit and subsequently resumes storing entries of trace data within the trace buffer resulting in a time discontinuity between a first entry and a second entry stored in consecutive memory slots; and
the controller, responsive to resuming storing trace data, sets a time marker bit in the second entry and causes a second time marker correlated with the time marker bit of the second entry to be stored within the time marker memory.

13. The system of claim 8, wherein the controller, responsive to detecting a second trigger event:
determines a second trace data entry within the trace buffer;

selectively sets a trigger bit of the second trace data entry;

sets a time marker bit in the second trace data entry and causes a second time marker that is correlated with the time marker bit in the second trace data entry to be stored in the time marker memory according to whether the second trace data entry is located within the capture region; and updates the upper bound memory slot of the capture region to a memory slot that is a predetermined number of memory slots after the second trace data entry.

14. The system of claim 13, wherein:

when the second trace data entry is within the capture region, the controller does not set the time marker bit in the second trace data entry and does not cause a time marker to be stored in the time marker memory; and when the second trace data entry is not within the capture region, the controller sets the time marker bit in the second trace data entry, causes a time marker to be stored in the time marker memory, and updates the lower bound pointer to reference a memory slot that is a predetermined number of memory slots prior to the second trace data entry.

15. A device, comprising:

a non-transitory data storage device usable by a system comprising a processor and a memory, wherein the data storage device stores program code that, when executed by the system, causes the system to instantiate a trace module within a programmable integrated circuit (IC), wherein the trace module performs operations comprising:

storing trace data from a circuit as entries within memory slots of a trace buffer;

wherein the storing of trace data is independent of occurrence of trigger events;

responsive to detecting a first trigger event, setting a trigger bit and a time marker bit within a first trace data entry stored within a first current memory slot of the trace buffer, wherein the trigger bit and the time marker bit are correlated with the first trigger event, determining a capture region of the trace buffer comprising the first trace data entry and having a range defined by a lower bound memory slot comprising an entry occurring prior to the first trace data entry and an upper bound memory slot to store an entry subsequent to the first trace data entry, wherein each memory slot of the capture region is associated with the first trigger event, and storing a first time marker correlated with the time marker bit of the first trace data entry within a time marker memory; and outputting content of the capture region from the trace buffer and outputting from the time marker memory each time marker correlated with a time marker bit within the capture region to a memory device that is independent of the trace buffer, wherein the outputting of each time marker to the memory device bypasses storage of the time marker in the trace buffer.

16. The device of claim 15, wherein the trace module performs further operations comprising, after writing each entry of trace data into the trace buffer, updating an end pointer referencing a next memory slot into which a next entry is to be stored.

17. The device of claim 15, wherein the trace module performs further operations comprising:

selecting a memory slot a first predetermined number of memory slots prior to the first current memory slot as the lower bound memory slot; and selecting a memory slot a second predetermined number of memory slots after the first current memory slot as the upper bound memory slot.

18. The device of claim 15, wherein the trace module performs further operations comprising:

writing the entry stored in the lower bound memory slot to the memory device;

responsive to writing the entry, updating a value of a lower bound pointer referencing the lower bound memory slot; and iteratively writing the entry stored in the lower bound memory slot indicated by the lower bound pointer and updating the value of the lower bound pointer to read out further content of the capture region.

19. The device of claim 15, wherein the trace module performs further operations comprising:

discontinuing storing entries of trace data within the trace buffer for at least one cycle of the circuit;

resuming storing entries of trace data within the trace buffer resulting in a time discontinuity between a first entry and a second entry stored in consecutive memory slots; and responsive to resuming storing of entries of trace data, setting a time marker bit in the second entry and storing a second time marker correlated with the time marker bit of the second entry within the time marker memory.

20. The device of claim 15, wherein the trace module, responsive to detecting a second trigger event, performs further operations comprising:

determining a second trace data entry within the trace buffer;

setting a trigger bit of the second trace data entry;

selectively setting a time marker bit in the second trace data entry and storing a second time marker in the time marker memory that is correlated with the time marker bit in the second trace data entry according to whether the second trace data entry is located within the capture region; and updating the upper bound memory slot of the capture region to a memory slot a predetermined number of memory slots after the second trace data entry.

* * * * *